United States Patent
Lin et al.

(10) Patent No.: US 11,760,266 B2
(45) Date of Patent: Sep. 19, 2023

(54) REARVIEW MIRROR WITH DISPLAY FUNCTION AND MANUFACTURING METHOD THEREOF

(71) Applicant: Unimicron Technology Corp., Taoyuan (TW)

(72) Inventors: Shih-Yao Lin, Hsin-chu County (TW); An-Sheng Lee, Hsin-chu County (TW); Ming-Yuan Hsu, Hsin-chu County (TW); Meng-Chia Chan, Hsin-chu County (TW)

(73) Assignee: Unimicron Technology Corp., Taoyuan (TW)

( * ) Notice: Subject to any disclaimer, the term of this patent is extended or adjusted under 35 U.S.C. 154(b) by 345 days.

(21) Appl. No.: 17/335,084

(22) Filed: Jun. 1, 2021

(65) Prior Publication Data

US 2021/0291740 A1    Sep. 23, 2021

Related U.S. Application Data

(63) Continuation-in-part of application No. 17/123,120, filed on Dec. 16, 2020, and a continuation-in-part of application No. 16/999,039, filed on Aug. 20, 2020.

(Continued)

(30) Foreign Application Priority Data

Nov. 27, 2019 (TW) .................................. 108143263
May 5, 2020 (TW) .................................. 109114917

(Continued)

(51) Int. Cl.
*B60R 1/12* (2006.01)
*B60R 1/08* (2006.01)
(Continued)

(52) U.S. Cl.
CPC ................ *B60R 1/12* (2013.01); *B60R 1/088* (2013.01); *G02F 1/155* (2013.01); *G02F 1/1533* (2013.01);
(Continued)

(58) Field of Classification Search
CPC ... B60R 1/12; B60R 1/088; B60R 2001/1215; B60R 2001/1253; G02F 1/1533;
(Continued)

(56) References Cited

U.S. PATENT DOCUMENTS

2013/0241973 A1* 9/2013 Park ...................... G02B 26/02
                                                            359/227

FOREIGN PATENT DOCUMENTS

TW    201602704    1/2016
TW    I524252    3/2016
(Continued)

OTHER PUBLICATIONS

"Office Action of Taiwan Counterpart Application", dated Aug. 4, 2022, p. 1-p. 9.

*Primary Examiner* — Edward J Glick
*Assistant Examiner* — William D Peterson
(74) *Attorney, Agent, or Firm* — JCIPRNET

(57) ABSTRACT

A rearview mirror with display function includes a display structure layer, a rearview mirror structure layer, a plastic frame and an electrochromic material. The display structure layer includes a first transparent substrate, a display body layer and a transflective layer on opposite sides of the first transparent substrate. The rearview mirror structure layer is disposed on one side of the display structure layer, and includes a second transparent substrate, a ring-shaped shielding layer, a touch sensing layer, an insulating substrate, and a transparent electrode layer. The ring-shaped shielding layer is disposed around a third surface of the (Continued)

second transparent substrate, and the touch sensing layer covers the third surface and the ring-shaped shielding layer. The ring-shaped shielding layer is electrically insulated from the touch sensing layer. The plastic frame, the transflective layer and the transparent electrode layer define an accommodating space. The electrochromic material is filled in the accommodating space.

27 Claims, 14 Drawing Sheets

Related U.S. Application Data

(60) Provisional application No. 63/133,421, filed on Jan. 4, 2021.

(30) Foreign Application Priority Data

Oct. 23, 2020 (TW) .................................. 109136850
Mar. 30, 2021 (TW) .................................. 110111442

(51) Int. Cl.
 *G02F 1/155* (2006.01)
 *G06F 3/041* (2006.01)
 *G02F 1/153* (2006.01)

(52) U.S. Cl.
 CPC .... *G06F 3/0412* (2013.01); *B60R 2001/1215* (2013.01); *B60R 2001/1253* (2013.01); *G02F 2001/1536* (2013.01); *G02F 2001/1552* (2013.01); *G06F 2203/04103* (2013.01)

(58) Field of Classification Search
 CPC ............. G02F 1/155; G02F 2001/1536; G02F 2001/1552; G06F 3/0412; G06F 2203/04103
 USPC ........................................................ 359/256
 See application file for complete search history.

(56) References Cited

FOREIGN PATENT DOCUMENTS

| TW | I524252 | B | * | 3/2016 | |
|----|---------|---|---|--------|---|
| TW | 201626083 | | | 7/2016 | |
| TW | 201626083 | A | * | 7/2016 | |
| TW | 201806803 | | | 3/2018 | |
| TW | 201806803 | A | * | 3/2018 | .............. B60R 1/04 |
| TW | I685780 | | | 2/2020 | |

* cited by examiner

REARVIEW MIRROR WITH DISPLAY FUNCTION AND MANUFACTURING METHOD THEREOF

CROSS-REFERENCE TO RELATED APPLICATION

This application is a continuation-in-part application of and claims the priority benefit of U.S. application Ser. No. 16/999,039, filed on Aug. 20, 2020. The prior U.S. application Ser. No. 16/999,039 claims the priority benefits of Taiwan applications serial no. 108143263, filed on Nov. 27, 2019, and serial no. 109114917, filed on May 5, 2020. This application is also a continuation-in-part application of and claims the priority benefit of U.S. application Ser. No. 17/123,120, filed on Dec. 16, 2020. The prior U.S. application Ser. No. 17/123,120 claims the priority benefit of Taiwan application serial no. 109136850, filed on Oct. 23, 2020. This application also claims the priority benefits of U.S. provisional application Ser. No. 63/133,421, filed on Jan. 4, 2021, and Taiwan application serial no. 110111442, filed on Mar. 30, 2021. The entirety of each of the above-mentioned patent applications is hereby incorporated by reference herein and made a part of this specification.

BACKGROUND

Technical Field

The disclosure relates to a rearview mirror and a manufacturing method thereof, and particularly relates to a rearview mirror with display function and a manufacturing method thereof.

Description of Related Art

Intelligent rearview mirror products with streaming media application provide a wider field of view by changing the focal length of a photographic lens, thereby reducing blind spots in vision present in traditional rearview mirrors to a certain degree. Drivers may obtain a full rear field of view simply by watching the rearview mirror and may not be easily distracted. However, since an intelligent rearview mirror with streaming media application has a display area as large as its mirror surface, it will become thicker and heavier if a touch sensing layer is further attached to its display through an optical adhesive layer.

SUMMARY

The disclosure provides a rearview mirror with display function, which has a simple, lightweight stacking structure and may improve the driving safety of drivers.

The disclosure further provides a manufacturing method of the rearview mirror with display function for manufacturing the rearview mirror.

The rearview mirror with display function of the disclosure includes a display structure layer, a rearview mirror structure layer, a plastic frame, and an electrochromic material. The display structure layer includes a first transparent substrate, a display body layer, and a transflective layer. The first transparent substrate has a first surface and a second surface opposite to each other. The display body layer is disposed on the first surface, and the transflective layer is disposed on the second surface. The rearview mirror structure layer is disposed on one side of the display structure layer, and includes a second transparent substrate, a ring-shaped shielding layer, a touch sensing layer, an insulating substrate, and a transparent electrode layer. The second transparent substrate has a third surface. The ring-shaped shielding layer is disposed around the third surface, and the touch sensing layer covers the third surface and the ring-shaped shielding layer. The ring-shaped shielding layer is electrically insulated from the touch sensing layer. The insulating substrate is disposed on the touch sensing layer, and the transparent electrode layer is disposed on the insulating substrate. The plastic frame is disposed between the transflective layer of the display structure layer and the transparent electrode layer of the rearview mirror structure layer. The plastic frame, the transflective layer, and the transparent electrode layer define an accommodating space. The electrochromic material is filled in the accommodating space.

In an embodiment of the disclosure, the insulating substrate is an insulating layer.

In an embodiment of the disclosure, a peripheral edge of the rearview mirror structure layer protrudes from a peripheral edge of the display structure layer by a spacing.

In an embodiment of the disclosure, the rearview mirror further includes a cover plate, which is disposed on the transparent electrode layer of the rearview mirror structure layer and defines an enclosed space with the transparent electrode layer. The display structure layer and the plastic frame are located in the enclosed space.

In an embodiment of the disclosure, an orthographic projection of the display structure layer on the rearview mirror structure layer partially overlaps the rearview mirror structure layer.

In an embodiment of the disclosure, the rearview mirror further includes a cover plate, which defines an enclosed space with the second transparent substrate of the rearview mirror structure layer. The display structure layer, the rearview mirror structure layer, and the plastic frame are located in the enclosed space. One side of the cover plate is flush with a fourth surface of the second transparent substrate opposite to the third surface.

In an embodiment of the disclosure, the peripheral edge of the display structure layer protrudes from the peripheral edge of the rearview mirror structure layer by a spacing.

In an embodiment of the disclosure, the insulating substrate is a glass substrate.

In an embodiment of the disclosure, a peripheral edge of the second transparent substrate protrudes from a peripheral edge of the glass substrate by a spacing, and the peripheral edge of the glass substrate is flush with the peripheral edge of the display structure layer.

In an embodiment of the disclosure, an orthographic projection of the display structure layer on the second transparent substrate partially overlaps an orthographic projection of the glass substrate on the second transparent substrate.

In an embodiment of the disclosure, the peripheral edge of the glass substrate protrudes from the peripheral edge of the second transparent substrate by a spacing, and the peripheral edge of the glass substrate is flush with the peripheral edge of the display structure layer.

In an embodiment of the disclosure, the rearview mirror structure layer further includes an optical adhesive layer disposed between the glass substrate and the touch sensing layer.

In an embodiment of the disclosure, the peripheral edge of the second transparent substrate protrudes from the peripheral edge of the glass substrate by a spacing, and the peripheral edge of the glass substrate is flush with the peripheral edge of the display structure layer.

In an embodiment of the disclosure, the rearview mirror further includes a cover plate, which is disposed on the second transparent substrate of the rearview mirror structure layer and defines an enclosed space with the second transparent substrate. The display structure layer, the plastic frame, the transparent electrode layer, the glass substrate, the optical adhesive layer, the touch sensing layer, and the ring-shaped shielding layer are located in the enclosed space.

In an embodiment of the disclosure, the peripheral edge of the second transparent substrate is flush with the peripheral edge of the glass substrate, and the orthographic projection of the display structure layer on the rearview mirror structure layer partially overlaps the rearview mirror structure layer.

In an embodiment of the disclosure, the rearview mirror further includes a cover plate, which defines an enclosed space with the second transparent substrate of the rearview mirror structure layer. The display structure layer, the plastic frame, and the rearview mirror structure layer are located in the enclosed space. One side of the cover plate is flush with a fourth surface of the second transparent substrate opposite to the third surface.

In an embodiment of the disclosure, the peripheral edge of the display structure layer protrudes from the peripheral edge of the rearview mirror structure layer by a spacing, and the peripheral edge of the glass substrate is flush with the peripheral edge of the second transparent substrate.

In an embodiment of the disclosure, the rearview mirror further includes a cover plate and at least one auxiliary apparatus. The cover plate and the second transparent substrate of the rearview mirror structure layer define an enclosed space. The display structure layer, the plastic frame, and the rearview mirror structure layer are located in the enclosed space. One side of the cover plate is flush with a fourth surface of the second transparent substrate opposite to the third surface. The auxiliary apparatus is disposed around the rearview mirror structure layer and is located in the enclosed space.

In an embodiment of the disclosure, the auxiliary apparatus includes at least one ambient light source detection sensor, at least one blind spot auxiliary device, at least one Bluetooth antenna, or a combination of the above components.

In an embodiment of the disclosure, the display body layer of the display structure layer includes multiple light-emitting diodes (LEDs), an insulating layer, a conductive circuit structure, and a protective layer. The LEDs are dispersedly disposed on the first transparent substrate, and the insulating layer covers the LEDs. The conductive circuit structure passes through the insulating layer to be electrically connected to the LEDs, and the protective layer covers the conductive circuit structure.

In an embodiment of the disclosure, the LEDs include multiple micro LEDs.

In an embodiment of the disclosure, a surface shape of the rearview mirror includes a circle, an ellipse, or a polygon.

In an embodiment of the disclosure, a visible surface shape of the second transparent substrate includes a plane or a curved surface.

In an embodiment of the disclosure, a visible surface area of the second transparent substrate is a full mirror surface.

The manufacturing method of the rearview mirror with display function of the disclosure includes the following steps. A display structure layer is provided. The display structure layer includes a first transparent substrate, a display body layer, and a transflective layer. The first transparent substrate has a first surface and a second surface opposite to each other. The display body layer is disposed on the first surface, and the transflective layer is disposed on the second surface. A rearview mirror structure layer is provided. The rearview mirror structure layer includes a second transparent substrate, a ring-shaped shielding layer, a touch sensing layer, an insulating substrate, and a transparent electrode layer. The second transparent substrate has a third surface. The ring-shaped shielding layer is disposed around the third surface, and the touch sensing layer covers the third surface and the ring-shaped shielding layer. The ring-shaped shielding layer is electrically insulated from the touch sensing layer. The insulating substrate is disposed on the touch sensing layer, and the transparent electrode layer is disposed on the insulating substrate. The display structure layer and the rearview mirror structure layer are fixed with a plastic frame. The plastic frame is located between the transflective layer of the display structure layer and the transparent electrode layer of the rearview mirror structure layer. The plastic frame, the transflective layer, and the transparent electrode layer define an accommodating space. An electrochromic material is infused into the accommodating space.

In an embodiment of the disclosure, the step of providing the display structure layer includes dispersedly disposing multiple LEDs on the first surface of the first transparent substrate. An insulating layer is formed to cover the LEDs. A conductive circuit structure is formed on the insulating layer. The conductive circuit structure passes through the insulating layer and is electrically connected to the LEDs. A protective layer is formed to cover the conductive circuit structure. The LEDs, the insulating layer, the conductive circuit structure, and the protective layer define the display body layer. The first transparent substrate and the display body layer thereon are flipped over to form the transflective layer on the second surface of the first transparent substrate.

In an embodiment of the disclosure, the step of providing the rearview mirror structure layer includes forming the ring-shaped shielding layer on the second transparent substrate. The touch sensing layer is formed on the second transparent substrate, and the touch sensing layer covers the third surface and the ring-shaped shielding layer. The insulating substrate is formed on the touch sensing layer. The transparent electrode layer is formed on the insulating substrate.

Based on the above, in the design of the rearview mirror with display function of the disclosure, the ring-shaped shielding layer and the touch sensing layer in the rearview mirror structure layer are both disposed on the second transparent substrate, and the ring-shaped shielding layer is electrically insulated from the touch sensing layer. That is, the ring-shaped shielding layer adopts a non-transparent and non-conductive material as a shielding ring and is directly integrated with the touch sensing layer on the same transparent substrate. In this way, the rearview mirror of the disclosure may have full-screen display function and touch function, and its overall thickness and weight may be effectively reduced. In addition, the display structure layer of the rearview mirror of the disclosure also integrates the display body layer and the transflective layer on the first transparent substrate, thereby effectively reducing the weight and thickness of the rearview mirror.

In order to make the aforementioned features and advantages of the disclosure comprehensible, embodiments accompanied with drawings are described in detail below.

DESCRIPTION OF THE EMBODIMENTS

Figure 1A:
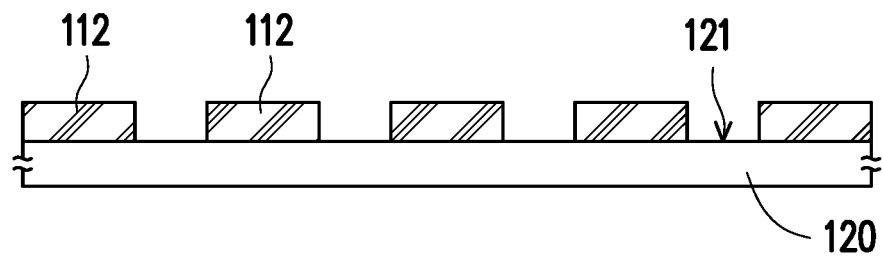
FIG. 1A to FIG. 1J are schematic cross-sectional views of a manufacturing method of a rearview mirror with display function according to an embodiment of the disclosure.

FIG. 1A to FIG. 1J are schematic cross-sectional views of a manufacturing method of a rearview mirror with display function according to an embodiment of the disclosure. Regarding the manufacturing method of the rearview mirror with display function of this embodiment, with reference to FIG. 1E first, a display structure layer 100 is provided. The display structure layer 100 includes a first transparent substrate 120, a display body layer 110, and a transflective layer 130. The first transparent substrate 120 has a first surface 121 and a second surface 123 opposite to each other. The display body layer 110 is disposed on the first surface 121, and the transflective layer 130 is disposed on the second surface 123.

In detail, regarding a step of providing the display structure layer 100, with reference to FIG. 1A, first, multiple light-emitting diodes (LEDs) 112 are dispersedly disposed on the first surface 121 of the first transparent substrate 120. Here, a material of the first transparent substrate 120 is, for example, glass, but it is not limited thereto. The LED 112 is, for example, a micro LED, a mini LED, an organic LED (OLED), a quantum dot (QD) LED (QD-LED), or a QD light-emitting layer.

Figure 1B:
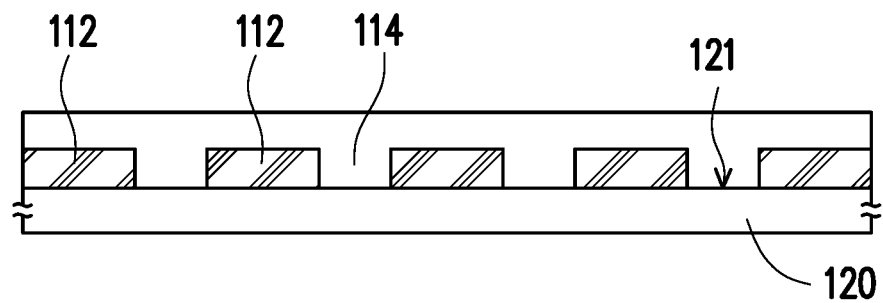

Next, with reference to FIG. 1B, an insulating layer 114 is formed to cover the LEDs 112. The insulating layer 114 completely covers the LEDs 112 and the first surface 121 of the first transparent substrate 120. Here, the insulating layer 114 may be regarded as a flat layer, and the insulating layer 114 is formed, for example, by coating.

Figure 1C:
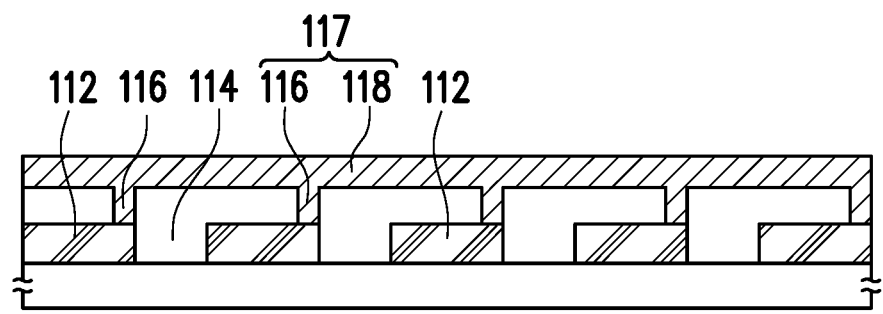

Next, with reference to FIG. 1C, a conductive circuit structure 117 is formed on the insulating layer 114. The conductive circuit structure 117 includes multiple conductive through holes 116 and a circuit layer 118. The conductive through holes 116 respectively pass through the insulating layer 114 to be electrically connected to the LEDs 112 respectively. The circuit layer 118 covers the insulating layer 114 and is connected to the conductive through holes 116.

Figure 1D:
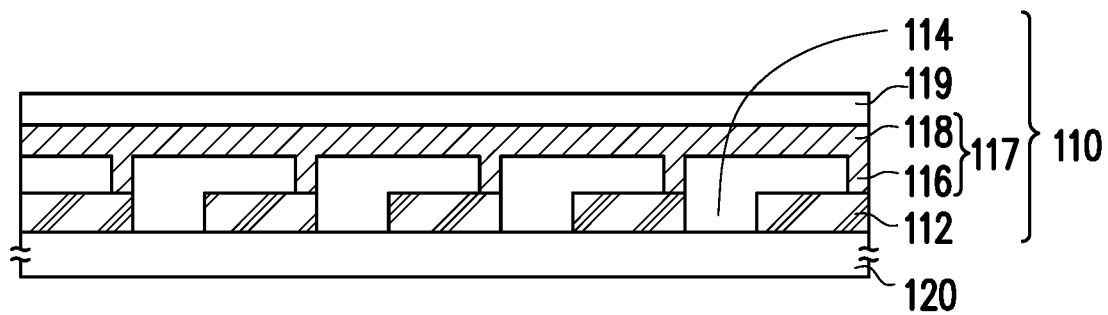

Next, with reference to FIG. 1D, a protective layer 119 is formed to cover the conductive circuit structure 117. The protective layer 119 directly covers the circuit layer 118. Here, the LEDs 112, the insulating layer 114, the conductive circuit structure 117, and the protective layer 119 define the display body layer 110. The display body layer 110 is, for example, a micro LED display or a mini LED display.

Figure 1E:
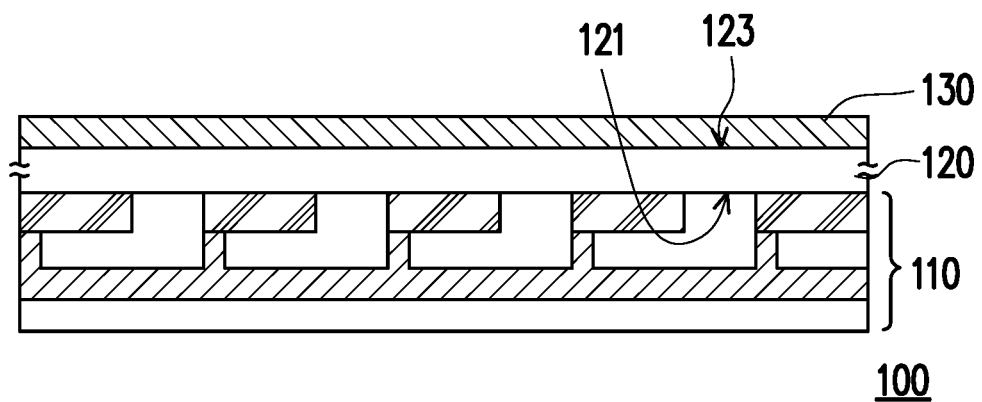

Next, after cutting the above structures into the required shape and size, with reference to FIG. 1E, the first transparent substrate 120 and the display body layer 110 thereon are flipped over to form the transflective layer 130 on the second surface 123 of the first transparent substrate 120. By this time, manufacturing of the display structure layer 100 has been completed.

Figure 1F:
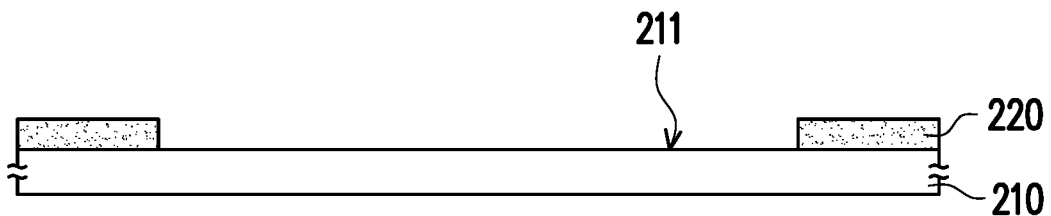
Figure 1G:
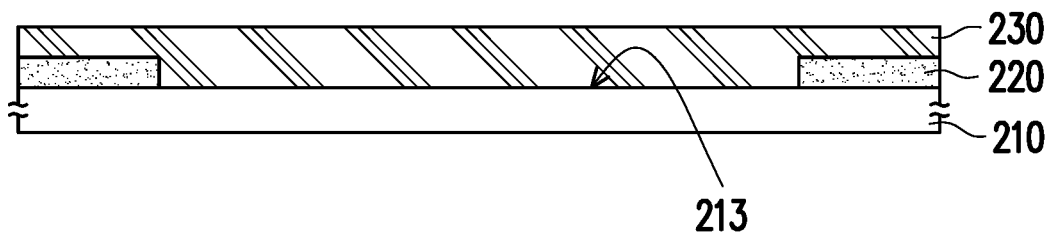
Figure 1H:
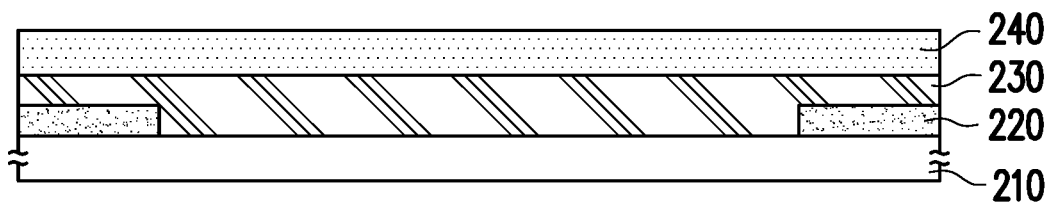
Figure 1I:
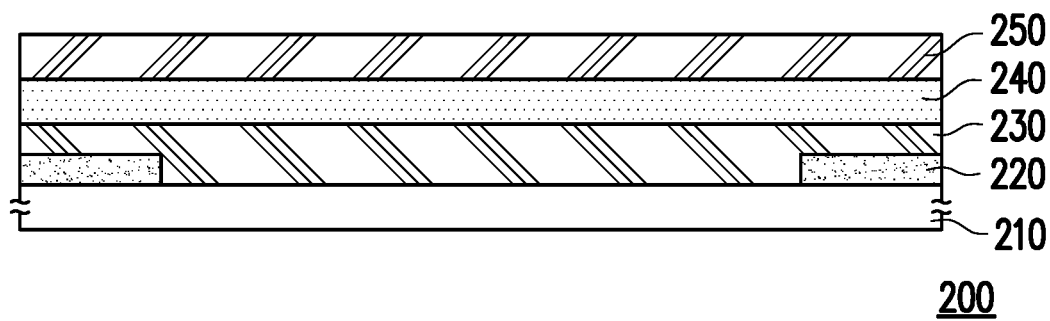

Next, with reference to FIG. 1I first, a rearview mirror structure layer 200 is provided. The rearview mirror structure layer 200 includes a second transparent substrate 210, a ring-shaped shielding layer 220, a touch sensing layer 230, an insulating substrate 240, and a transparent electrode layer 250.

In detail, regarding a step of providing the rearview mirror structure layer 200, with reference to FIG. 1F first, the ring-shaped shielding layer 220 is formed on the second transparent substrate 210. The second transparent substrate 210 has a third surface 211, and the ring-shaped shielding layer 220 is disposed around the third surface 211. In other words, the ring-shaped shielding layer 220 does not completely cover the third surface 211 and is only disposed around the third surface 211. Moreover, a peripheral edge of the ring-shaped shielding layer 220 is flush with a peripheral edge of the second transparent substrate 210. Here, a material of the second transparent substrate 210 is, for example, glass, but it is not limited thereto.

Next, with reference to FIG. 1G, the touch sensing layer 230 is formed on the second transparent substrate 210, where the touch sensing layer 230 covers the third surface 211 of the second transparent substrate 210 and the ring-shaped shielding layer 220. In this embodiment, the ring-shaped shielding layer 220 adopts a non-transparent and non-conductive material as a shielding ring, and is directly integrated with the touch sensing layer 230 on the same second transparent substrate 210. In particular, the ring-shaped shielding layer 220 is electrically insulated from the touch sensing layer 230. In other words, in this embodiment, the touch sensing layer 230 is formed by coating the ring-shaped shielding layer 220 and the third surface 211 of the second transparent substrate 210 exposed by the ring-shaped shielding layer 220. Here, stacking structures of the ring-shaped shielding layer 220 and the touch sensing layer 230 may achieve full-screen touch. If the color of the ring-shaped shielding layer 220 is silver, then it may be used as a mirror with touch function.

Next, with reference to FIG. 1H, the insulating substrate 240 is formed on the touch sensing layer 230, where the insulating substrate 240 is disposed on the touch sensing layer 230 and covers the touch sensing layer 230. Here, the insulating substrate 240 is embodied as an insulating layer.

Next, with reference to FIG. 1I, the transparent electrode layer 250 is formed on the insulating substrate 240, where the transparent electrode layer 250 is disposed on the insulating substrate 240 and covers the insulating substrate 240. By this time, manufacturing of the rearview mirror structure layer 200 has been completed.

Figure 1J:
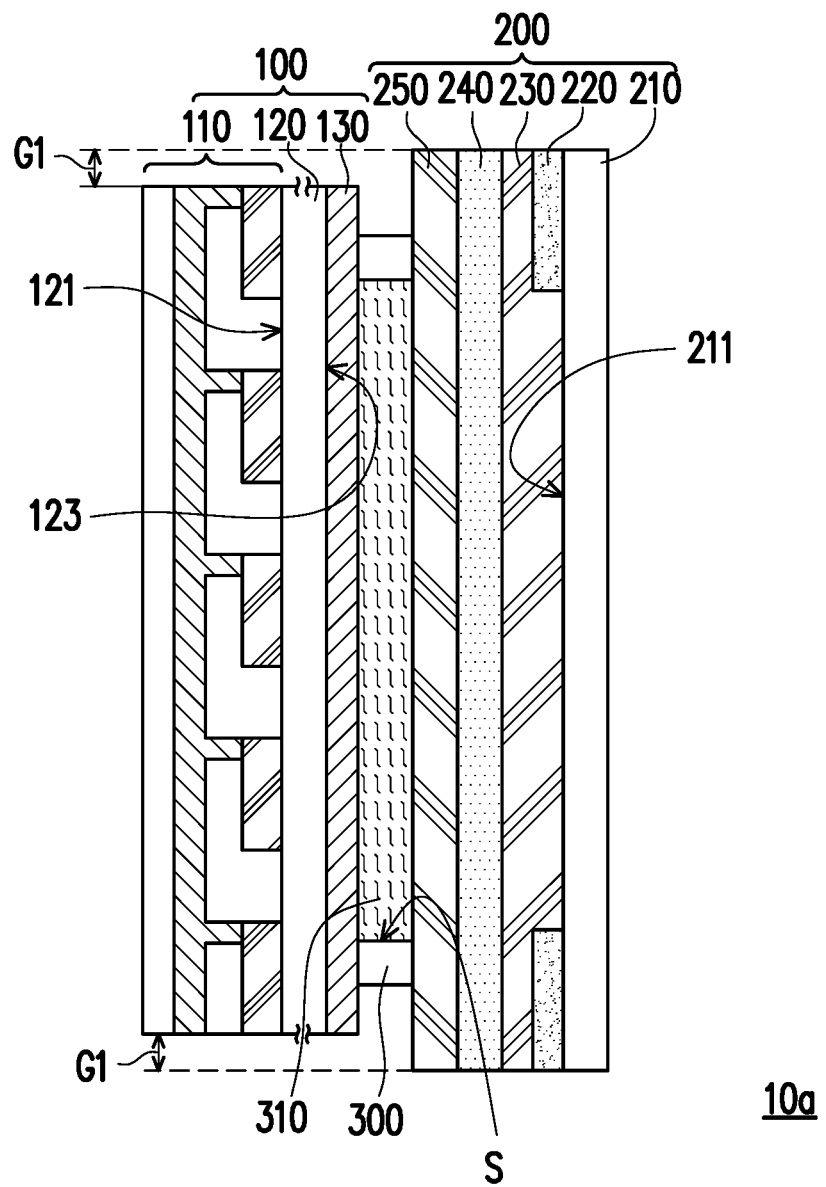

Next, with reference to FIG. 1J, the display structure layer 100 and the rearview mirror structure layer 200 are fixed with a plastic frame 300. The plastic frame 300 is located between the transflective layer 130 of the display structure layer 100 and the transparent electrode layer 250 of the rearview mirror structure layer 200. The plastic frame 300, the transflective layer 130, and the transparent electrode layer 250 define an accommodating space S.

Finally, with reference to FIG. 1J again, an electrochromic material 310 is infused into the accommodating space S to complete manufacturing of a rearview mirror 10a with display function.

Regarding the structure, with reference to FIG. 1J again, the rearview mirror 10a includes the display structure layer 100, the rearview mirror structure layer 200, the plastic frame 300, and the electrochromic material 310. The display structure layer 100 includes the first transparent substrate 120, the display body layer 110, and the transflective layer 130. The first transparent substrate 120 has the first surface 121 and the second surface 123 opposite to each other. The display body layer 110 is disposed on the first surface 121, and the transflective layer 130 is disposed on the second surface 123. The rearview mirror structure layer 200 is disposed on one side of the display structure layer 100, and includes the second transparent substrate 210, the ring-shaped shielding layer 220, the touch sensing layer 230, the insulating substrate 240, and the transparent electrode layer 250. The second transparent substrate 210 has the third surface 211. The ring-shaped shielding layer 220 is disposed around the third surface 211, and the touch sensing layer 230 covers the third surface 211 and the ring-shaped shielding layer 220. The ring-shaped shielding layer 220 is electrically insulated from the touch sensing layer 230. The insulating substrate 240 is embodied as the insulating layer and is disposed on the touch sensing layer 230, and the transparent electrode layer 250 is disposed on the insulating substrate 240. The plastic frame 300 is disposed between the transflective layer 130 of the display structure layer 100 and the transparent electrode layer 250 of the rearview mirror structure layer 200. The plastic frame 300, the transflective layer 130, and the transparent electrode layer 250 define the accommodating space S. The electrochromic material 310 is filled in the accommodating space S.

In the rearview mirror 10a of this embodiment, the display structure layer 100 and the rearview mirror structure layer 200 are fixed with the plastic frame 300, which means the rearview mirror 10a of this embodiment is embodied as a two-layered stacking structure. As shown in FIG. 1J, a peripheral edge of the rearview mirror structure layer 200 of this embodiment protrudes from a peripheral edge of the display structure layer 100 by a spacing G1. That is, the rearview mirror structure layer 200 of this embodiment is larger in size than the display structure layer 100, but it is not limited thereto. In addition, in one embodiment, a surface shape of the rearview mirror 10a is, for example, a circle, an ellipse, or a polygon. In another embodiment, a visible surface shape of the second transparent substrate 210 is, for example, a plane or a curved surface. In still another embodiment, a visible surface area of the second transparent substrate 210 may be, for example, a full mirror surface.

The ring-shaped shielding layer 220 and the touch sensing layer 230 in the rearview mirror structure layer 200 of this embodiment are both disposed on the second transparent substrate 210, and the ring-shaped shielding layer 220 is electrically insulated from the touch sensing layer 230. That is, the ring-shaped shielding layer 220 adopts a non-transparent and non-conductive material as a shielding ring, and is directly integrated with the touch sensing layer 230 on the same transparent substrate. In this way, the rearview mirror 10a of this embodiment may have full-screen display function and touch function, and its overall thickness and weight may be effectively reduced. The driver may directly touch and operate the rearview mirror 10a, which is sensitive, user-friendly, and good looking. In addition, the display structure layer 100 of the rearview mirror 10a of this embodiment also integrates the display body layer 110 and the transflective layer 130 on the first transparent substrate 120, thereby effectively reducing the weight and thickness of the rearview mirror 10a.

It should be noted that the following embodiments use the reference numerals and part of the contents of the above embodiments, and the same reference numerals are used to denote the same or similar elements, and the description of the same technical contents is omitted. For the description of the omitted parts, reference may be made to the foregoing embodiments, and details are not described in the following embodiment.

Figure 2:
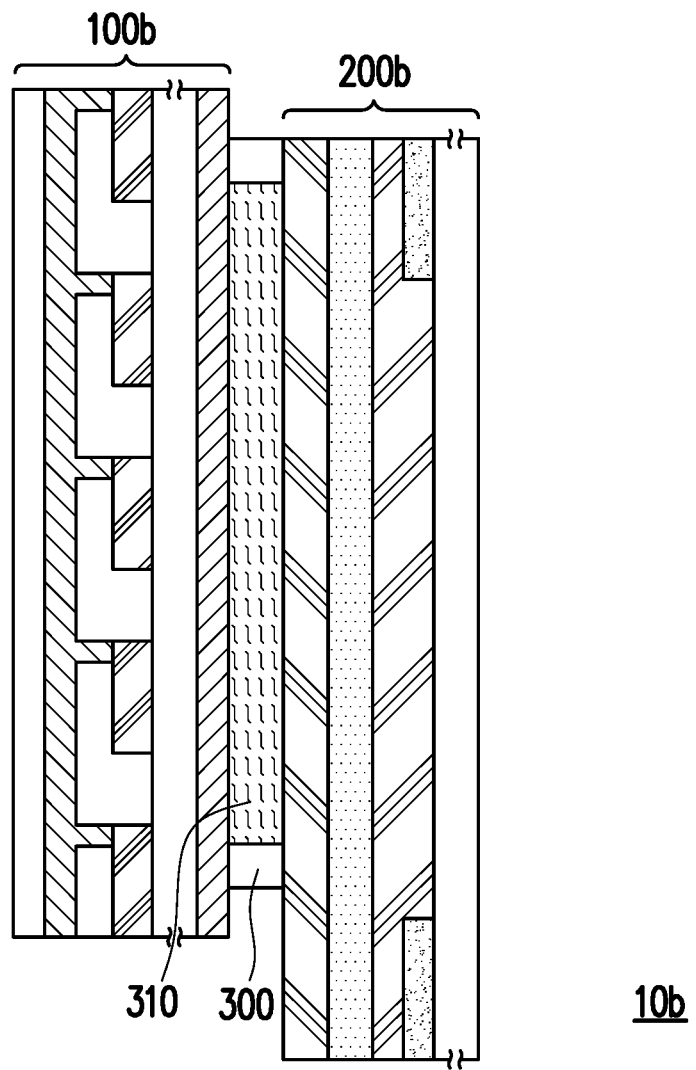
FIG. 2 is a schematic cross-sectional view of a rearview mirror with display function according to another embodiment of the disclosure.

FIG. 2 is a schematic cross-sectional view of a rearview mirror with display function according to another embodiment of the disclosure. With reference to FIG. 1J and FIG. 2 together, a rearview mirror 10b of this embodiment is similar to the above rearview mirror 10a, and the difference between the two lies in that: in the rearview mirror 10b of this embodiment, an orthographic projection of a display structure layer 100b on a rearview mirror structure layer 200b partially overlaps the rearview mirror structure layer 200b, which means the display structure layer 100b and the rearview mirror structure layer 200b are disposed in a misaligned manner.

Figure 3:
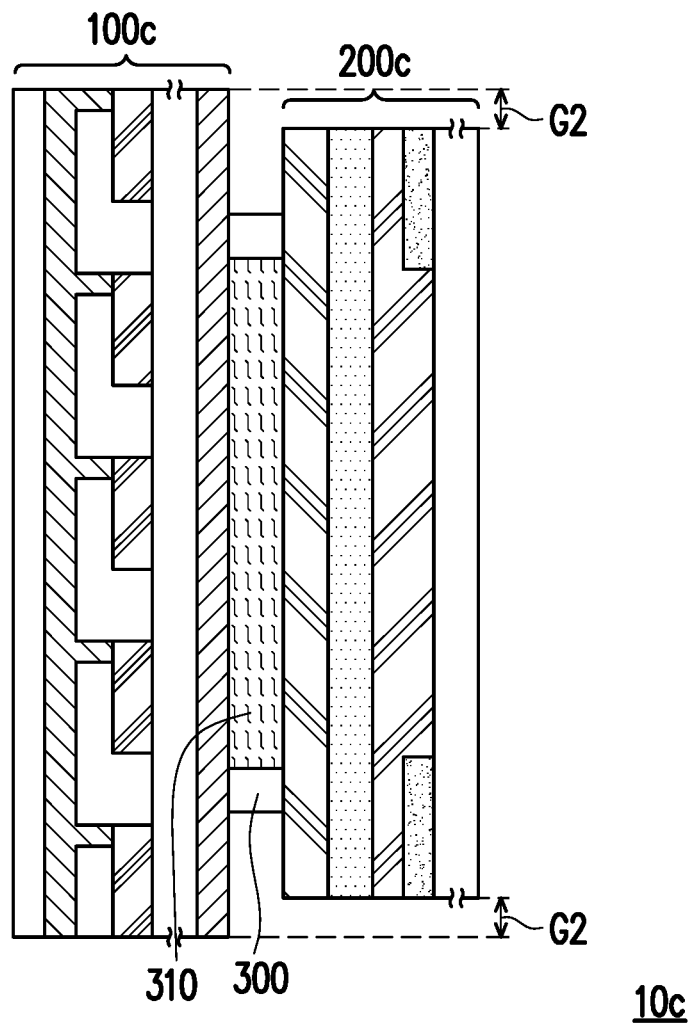
FIG. 3 is a schematic cross-sectional view of a rearview mirror with display function according to another embodiment of the disclosure.

FIG. 3 is a schematic cross-sectional view of a rearview mirror with display function according to another embodiment of the disclosure. With reference to FIG. 1J and FIG. 3 together, a rearview mirror 10c of this embodiment is similar to the above rearview mirror 10a, and the difference between the two lies in that: in the rearview mirror 10c of this embodiment, a peripheral edge of a display structure layer 100c protrudes from a peripheral edge of a rearview mirror structure layer 200c by a spacing G2. That is, the display structure layer 100c is larger in size than the rearview mirror structure layer 200c.

Figure 4:
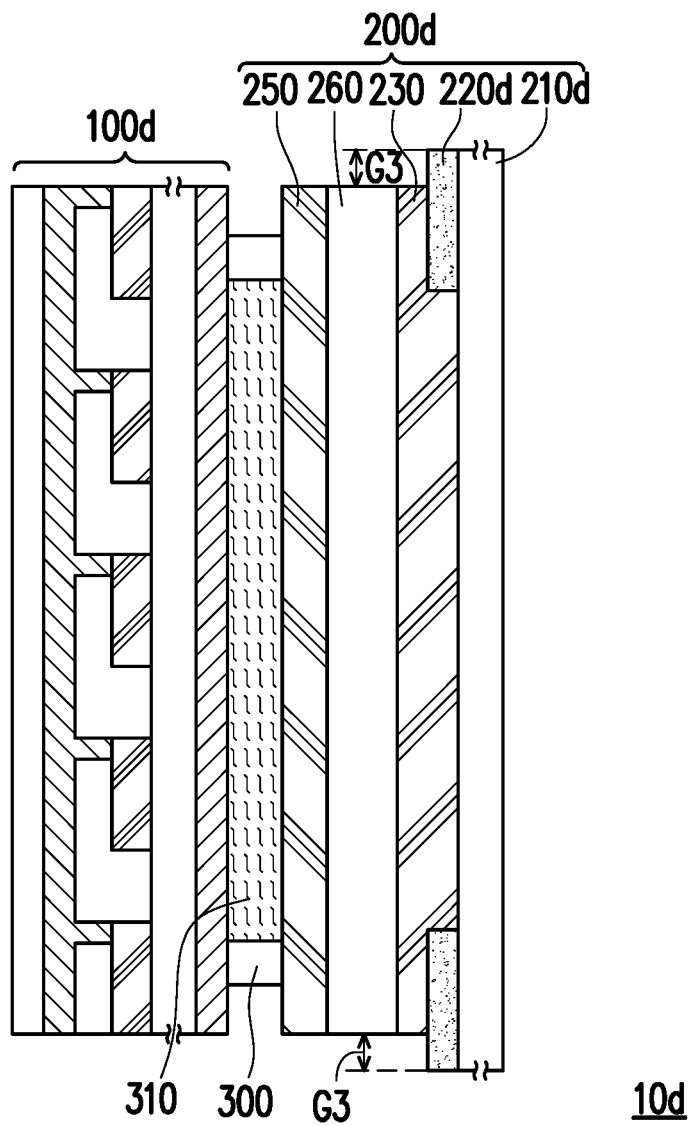
FIG. 4 is a schematic cross-sectional view of a rearview mirror with display function according to another embodiment of the disclosure.

FIG. 4 is a schematic cross-sectional view of a rearview mirror with display function according to another embodiment of the disclosure. With reference to FIG. 1J and FIG. 4 together, a rearview mirror 10d of this embodiment is similar to the above rearview mirror 10a, and the difference between the two lies in that: in the rearview mirror 10d of this embodiment, an insulating substrate of a rearview mirror structure layer 200d is embodied as a glass substrate 260, and a second transparent substrate 210d and a peripheral edge of a ring-shaped shielding layer 220d thereon protrude from a peripheral edge of the glass substrate 260 by a spacing G3. Moreover, the peripheral edge of the glass substrate 260 is flush with a peripheral edge of a display structure layer 100d. That is, the rearview mirror 10d of this embodiment is embodied as a three-layered stacking structure, which means it is composed of three transparent (such as glass) substrates.

Figure 5:
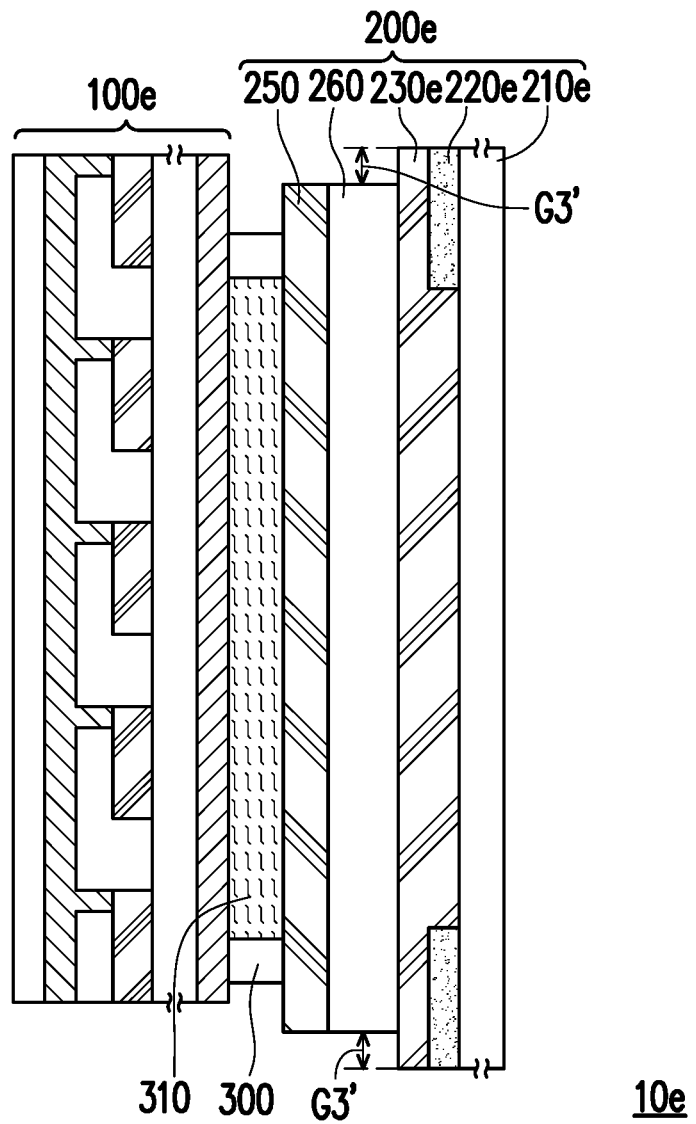
FIG. 5 is a schematic cross-sectional view of a rearview mirror with display function according to another embodiment of the disclosure.

FIG. 5 is a schematic cross-sectional view of a rearview mirror with display function according to another embodiment of the disclosure. With reference to FIG. 4 and FIG. 5 together, a rearview mirror 10e of this embodiment is similar to the above rearview mirror 10d, and the difference between the two lies in that: in the rearview mirror 10e of this embodiment, a peripheral edge of a second transparent substrate 210e and a peripheral edge of a ring-shaped shielding layer 220e thereon are flush with a peripheral edge of a touch sensing layer 230e, and protrude from the peripheral edge of the glass substrate 260 and a peripheral edge of the transparent electrode layer 250 thereon by a spacing G3'. An orthographic projection of a display structure layer 100e on the second transparent substrate 210e partially overlaps an orthographic projection of the glass substrate 260 on the second transparent substrate 210e. That is, the glass substrate 260 of the rearview mirror structure layer 200e, the transparent electrode layer 250 thereon, and the display structure layer 100e are disposed in a misaligned manner. The orthographic projection of the display structure layer 100e on the second transparent substrate 210e overlaps the second transparent substrate 210e.

Figure 6:
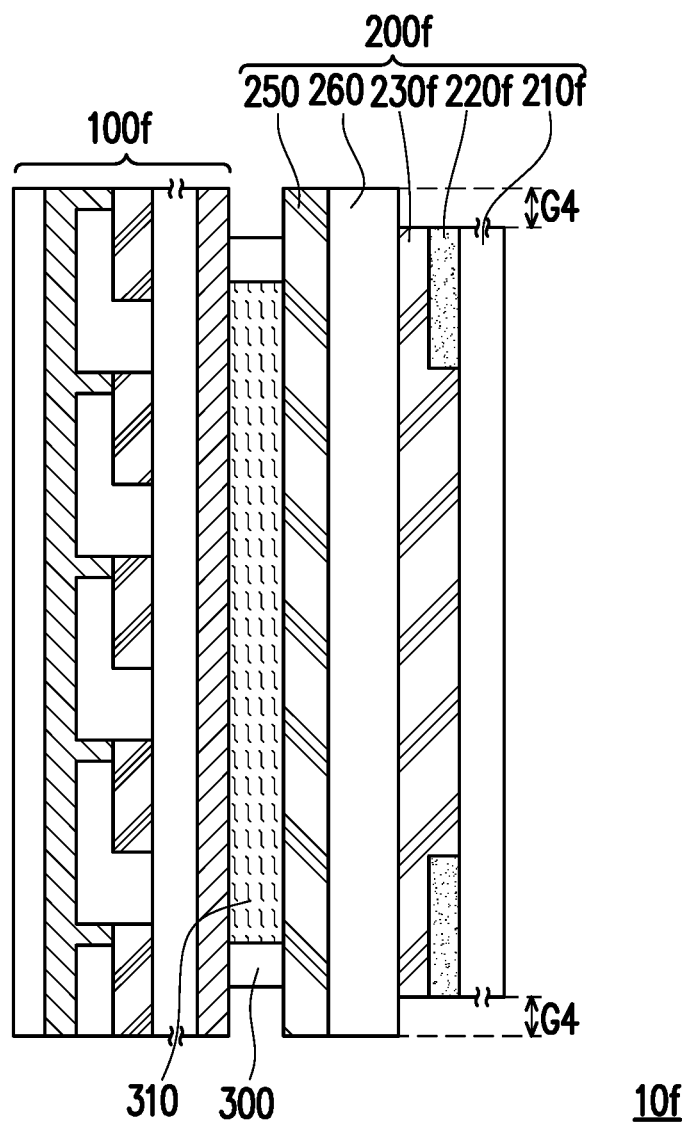
FIG. 6 is a schematic cross-sectional view of a rearview mirror with display function according to another embodiment of the disclosure.

FIG. 6 is a schematic cross-sectional view of a rearview mirror with display function according to another embodiment of the disclosure. With reference to FIG. 4 and FIG. 6 together, a rearview mirror 10f of this embodiment is similar to the above rearview mirror 10d, and the difference between the two lies in that: in the rearview mirror 10f of this embodiment, the peripheral edge of the glass substrate 260 of a rearview mirror structure layer 200f protrudes from a peripheral edge of a second transparent substrate 210f by a spacing G4. Moreover, the peripheral edge of the glass substrate 260 is flush with a peripheral edge of a display structure layer 100f. In other words, the display structure layer 100f is as large as the glass substrate 260 and the transparent electrode layer 250 thereon, and is larger in size than the second transparent substrate 210f, and a ring-shaped shielding layer 220f and a touch sensing layer 230f thereon. Here, peripheral edges of the second transparent substrate 210f and the ring-shaped shielding layer 220f and the touch sensing layer 230f thereon are flush with each other.

Figure 7:
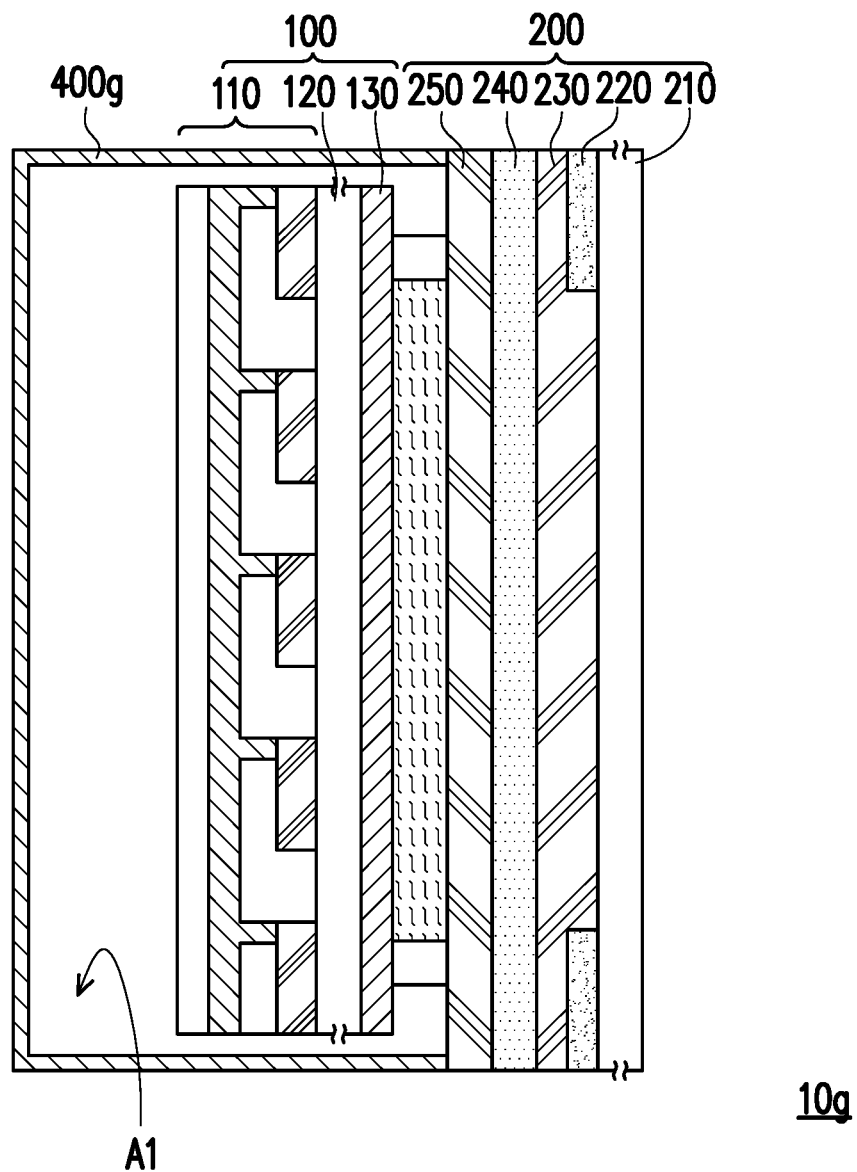
FIG. 7 is a schematic cross-sectional view of a rearview mirror with display function according to another embodiment of the disclosure.

FIG. 7 is a schematic cross-sectional view of a rearview mirror with display function according to another embodiment of the disclosure. With reference to FIG. 1J and FIG. 7 together, a rearview mirror 10g of this embodiment is similar to the above rearview mirror 10a, and the difference between the two lies in that: the rearview mirror 10g of this embodiment further includes a cover plate 400g, which is disposed on the transparent electrode layer 250 of the rearview mirror structure layer 200 and defines an enclosed space A1 with the transparent electrode layer 250. The display structure layer 100 and the plastic frame 300 are located in the enclosed space A1. Here, a peripheral edge of the cover plate 400g is flush with a peripheral edge of the rearview mirror structure layer 200, so that the rearview mirror 10g is frameless.

Figure 8:
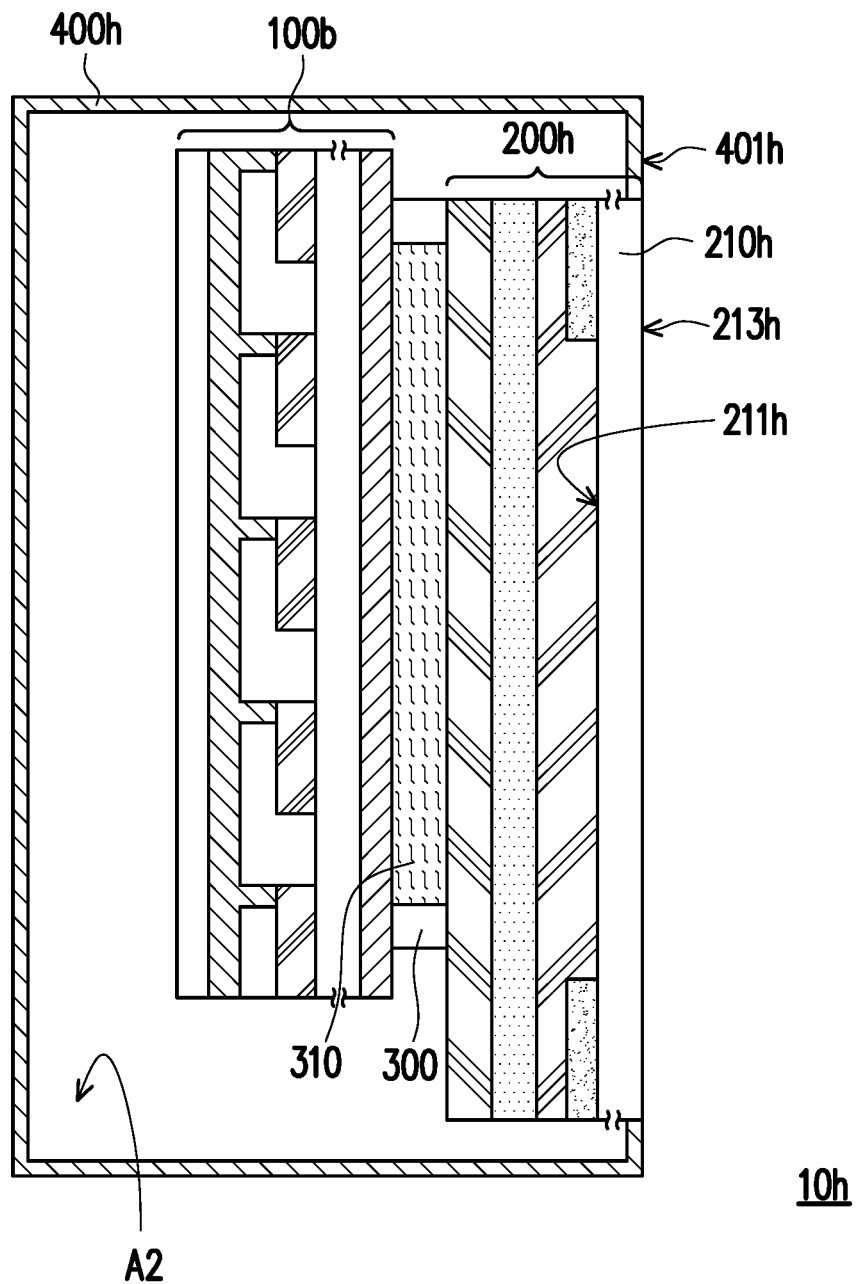
FIG. 8 is a schematic cross-sectional view of a rearview mirror with display function according to another embodiment of the disclosure.

FIG. 8 is a schematic cross-sectional view of a rearview mirror with display function according to another embodiment of the disclosure. With reference to FIG. 2 and FIG. 8 together, a rearview mirror 10h of this embodiment is similar to the above rearview mirror 10b, and the difference between the two lies in that: the rearview mirror 10h of this embodiment further includes a cover plate 400h, which defines an enclosed space A2 with a second transparent substrate 210h of a rearview mirror structure layer 200h. The display structure layer 100b, the rearview mirror structure layer 200h, and the plastic frame 300 are located in the enclosed space A2. One side 401h of the cover plate 400h is flush with a fourth surface 213h of the second transparent substrate 210h opposite to a third surface 211h, so that a front surface of the rearview mirror 10h (i.e., the fourth surface 213h and the one side 401h of the cover plate 400h seen by the user) is a plane.

Figure 9:
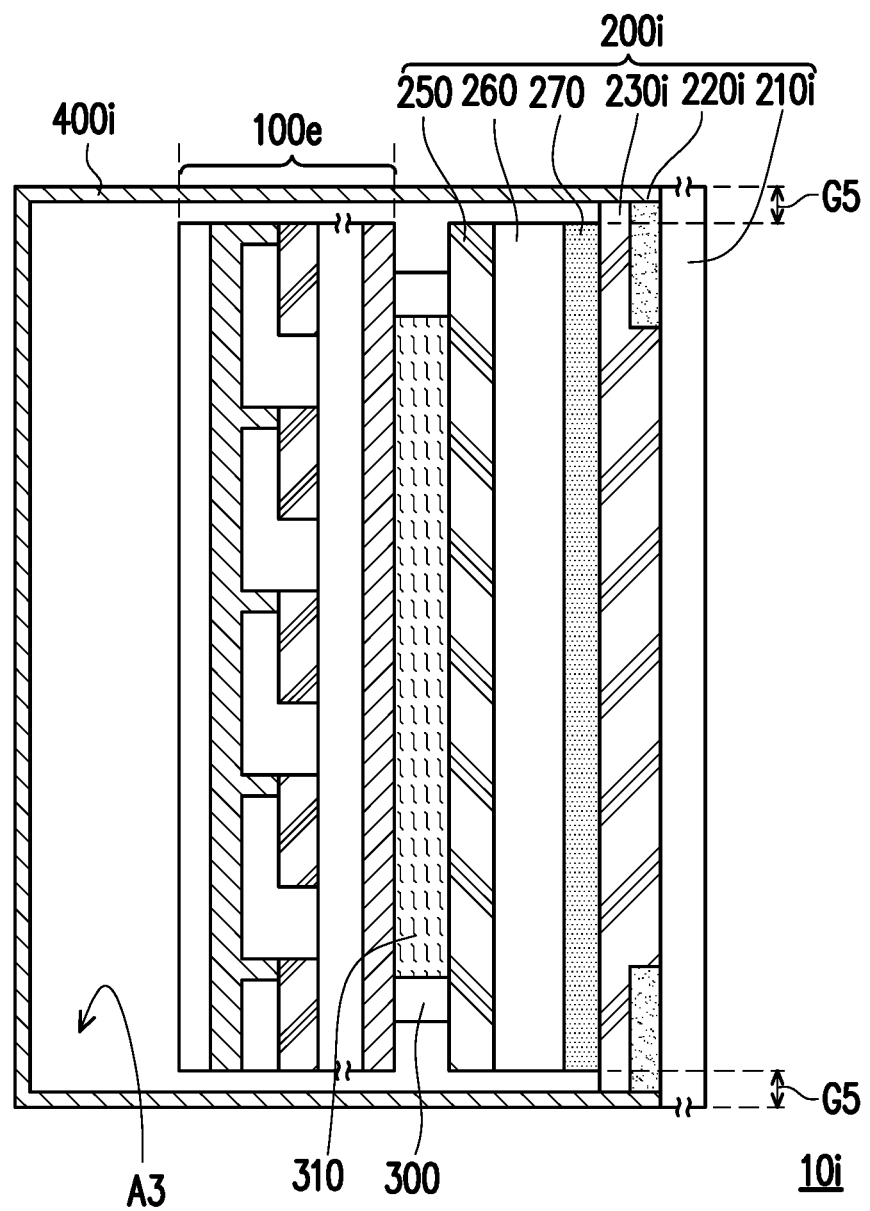
FIG. 9 is a schematic cross-sectional view of a rearview mirror with display function according to another embodiment of the disclosure.

FIG. 9 is a schematic cross-sectional view of a rearview mirror with display function according to another embodiment of the disclosure. With reference to FIG. 5 and FIG. 9 together, a rearview mirror 10i of this embodiment is similar to the above rearview mirror 10e, and the difference between the two lies in that: in this embodiment, a rearview mirror structure layer 200i further includes an optical adhesive layer 270 disposed between the glass substrate 260 and a touch sensing layer 230i. A peripheral edge of a second transparent substrate 210i protrudes from the peripheral edge of the glass substrate 260 by a spacing G5. Moreover, the peripheral edge of the glass substrate 260 is flush with a peripheral edge of the display structure layer 100e. In other words, the display structure layer 100e is as large as the glass substrate 260 and the transparent electrode layer 250 and the optical adhesive layer 270 thereon, and is smaller in size than the second transparent substrate 210i and a ring-shaped shielding layer 220i and the touch sensing layer 230i thereon. Here, a peripheral edge of the ring-shaped shielding layer 220i and a peripheral edge of the touch sensing layer 230i are flush with each other. That is, the rearview mirror 10i of this embodiment has a large front glass (i.e., the second transparent substrate 210i) and a small rear glass (i.e., the first transparent substrate 120, with reference to FIG. 1J).

In addition, the rearview mirror 10i of this embodiment further includes a cover plate 400i, which is disposed on the second transparent substrate 210i of the rearview mirror structure layer 200i and defines an enclosed space A3 with the second transparent substrate 210i. The display structure layer 100e, the plastic frame 300, the transparent electrode layer 250, the glass substrate 260, the optical adhesive layer 270, the touch sensing layer 230i, and the ring-shaped shielding layer 220i are located in the enclosed space A3, where a peripheral edge of the touch sensing layer 230i and the peripheral edge of the ring-shaped shielding layer 220i abut against the cover plate 400i, and the rearview mirror 10i is frameless.

Figure 10:
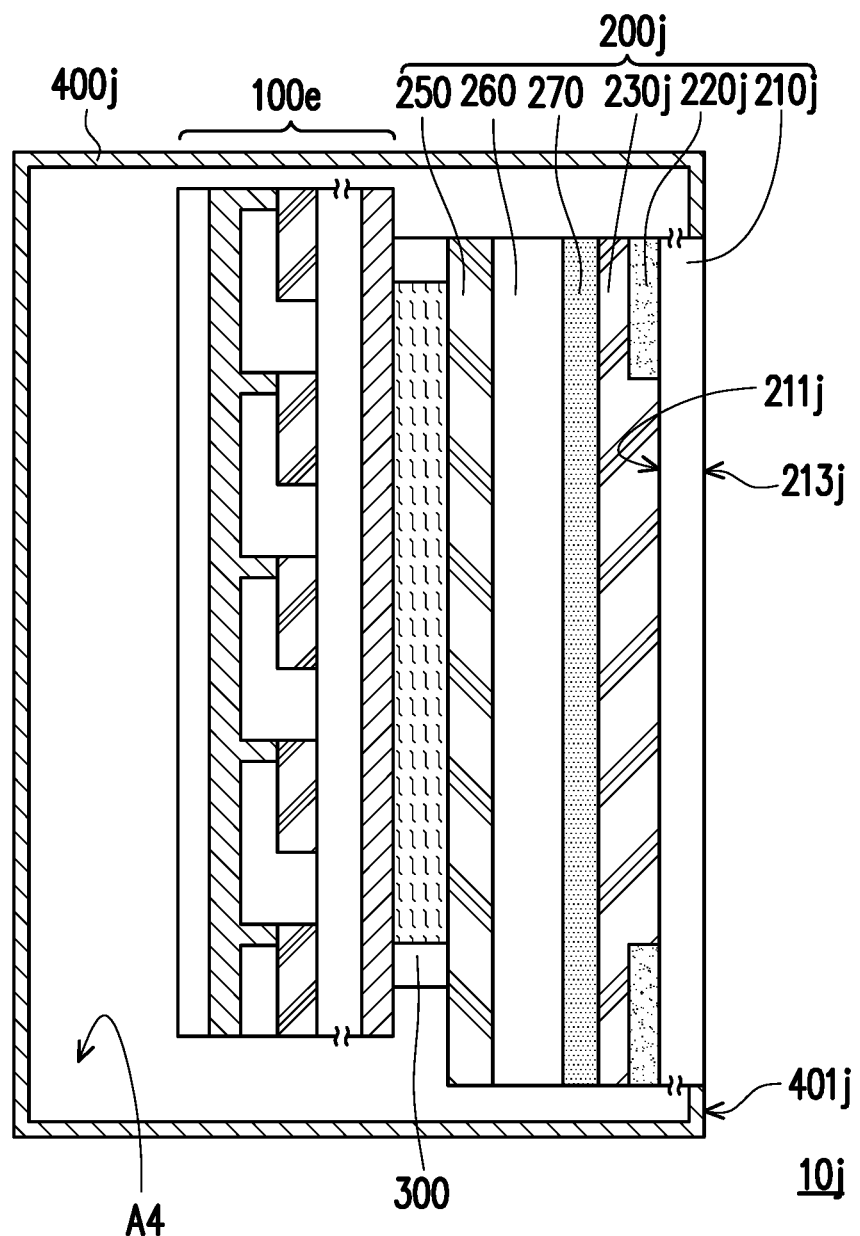
FIG. 10 is a schematic cross-sectional view of a rearview mirror with display function according to another embodiment of the disclosure.

FIG. 10 is a schematic cross-sectional view of a rearview mirror with display function according to another embodiment of the disclosure. With reference to FIG. 9 and FIG. 10 together, a rearview mirror 10j of this embodiment is similar to the above rearview mirror 10i, and the difference between the two lies in that: in this embodiment, a peripheral edge of a second transparent substrate 210j of a rearview mirror structure layer 200j is flush with the peripheral edge of the glass substrate 260, and an orthographic projection of the display structure layer 100e on the rearview mirror structure layer 200j partially overlaps the rearview mirror structure layer 200j. Here, peripheral edges of the second transparent substrate 210j, a ring-shaped shielding layer 220j, a touch sensing layer 230j, the optical adhesive layer 270, the glass substrate 260, and the transparent electrode layer 250 of the rearview mirror structure layer 200j are all flush with each other. In other words, the display structure layer 100e and the rearview mirror structure layer 200j are disposed in a misaligned manner.

In addition, in this embodiment, the rearview mirror 10j further includes a cover plate 400j, which defines an enclosed space A4 with the second transparent substrate 210j of the rearview mirror structure layer 200j. The display structure layer 100e, the plastic frame 300, and the rearview mirror structure layer 200j are located in the enclosed space A4. One side 401j of the cover plate 400j is flush with a fourth surface 213j of the second transparent substrate 210j opposite to a third surface 211j, so that a front surface of the rearview mirror 10j (i.e., the fourth surface 213j and the one side 401j of the cover plate 400j seen by the user) is a plane.

Figure 11:
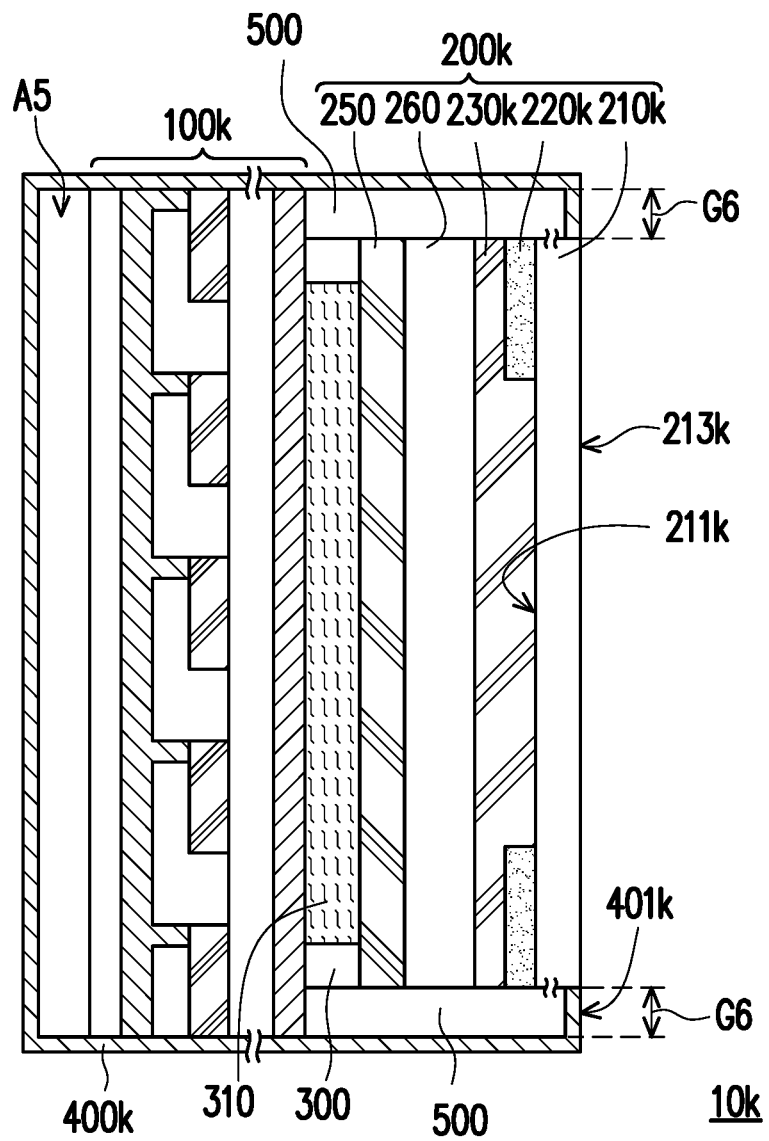
FIG. 11 is a schematic cross-sectional view of a rearview mirror with display function according to another embodiment of the disclosure.

FIG. 11 is a schematic cross-sectional view of a rearview mirror with display function according to another embodiment of the disclosure. With reference to FIG. 5 and FIG. 11 together, a rearview mirror 10k of this embodiment is similar to the above rearview mirror 10e, and the difference between the two lies in that: in this embodiment, a peripheral edge of a display structure layer 100k protrudes from a peripheral edge of a rearview mirror structure layer 200k by a spacing G6. The peripheral edge of the glass substrate 260 is flush with a peripheral edge of a second transparent substrate 210k. Here, peripheral edges of the second transparent substrate 210k, a ring-shaped shielding layer 220k, a touch sensing layer 230k, the glass substrate 260, and the transparent electrode layer 250 of the rearview mirror structure layer 200k are all flush with each other.

Moreover, the rearview mirror 10k of this embodiment further includes a cover plate 400k and at least one auxiliary apparatus 500. The cover plate 400k and the second transparent substrate 210k of the rearview mirror structure layer 200k define an enclosed space A5. The display structure layer 100k, the plastic frame 300, and the rearview mirror structure layer 200k are located in the enclosed space A5, where a peripheral edge of the display structure layer 100k abuts against the cover plate 400k. One side 401k of the cover plate 400k is flush with a fourth surface 213k of the second transparent substrate 210k opposite to a third surface 211k, so that a front surface of the rearview mirror 10k (i.e., the fourth surface 213k and the one side 401k of the cover plate 400k seen by the user) is a plane. The auxiliary apparatus 500 is disposed around the rearview mirror structure layer 200k and is located in the enclosed space A5. Here, the auxiliary apparatus 500 is, for example, an ambient light source detection sensor, a blind spot auxiliary device, a Bluetooth antenna, or a combination of the above components.

In summary, in the design of the rearview mirror with display function of the disclosure, the ring-shaped shielding layer and the touch sensing layer in the rearview mirror structure layer are both disposed on the second transparent substrate, and the ring-shaped shielding layer is electrically insulated from the touch sensing layer. That is, the ring-shaped shielding layer adopts a non-transparent and non-conductive material as the shielding ring and is directly integrated with the touch sensing layer on the same transparent substrate. In this way, the rearview mirror of the disclosure may have full-screen display function and touch function, and its overall thickness and weight may be effectively reduced. In addition, the display structure layer of the rearview mirror of the disclosure also integrates the display body layer and the transflective layer on the first transparent substrate, thereby effectively reducing the weight and thickness of the rearview mirror.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A rearview mirror with display function, comprising:
   a display structure layer, comprising a first transparent substrate, a display body layer, and a transflective layer, wherein the first transparent substrate has a first surface and a second surface opposite to each other, the display body layer is disposed on the first surface, and the transflective layer is disposed on the second surface;
   a rearview mirror structure layer, disposed on one side of the display structure layer, and comprising a second transparent substrate, a ring-shaped shielding layer, a touch sensing layer, an insulating substrate, and a transparent electrode layer, wherein the second transparent substrate has a third surface, the ring-shaped shielding layer is disposed around the third surface, the touch sensing layer covers the third surface and the ring-shaped shielding layer, the ring-shaped shielding layer is electrically insulated from the touch sensing layer, the insulating substrate is disposed on the touch sensing layer, and the transparent electrode layer is disposed on the insulating substrate;
   a plastic frame, disposed between the transflective layer of the display structure layer and the transparent electrode layer of the rearview mirror structure layer, wherein the plastic frame, the transflective layer, and the transparent electrode layer define an accommodating space; and
   an electrochromic material, filled in the accommodating space.

2. The rearview mirror with display function according to claim 1, wherein the insulating substrate is an insulating layer.

3. The rearview mirror with display function according to claim 2, wherein a peripheral edge of the rearview mirror structure layer protrudes from a peripheral edge of the display structure layer by a spacing.

4. The rearview mirror with display function according to claim 3, further comprising:
   a cover plate, disposed on the transparent electrode layer of the rearview mirror structure layer, and defining an enclosed space with the transparent electrode layer, wherein the display structure layer and the plastic frame are located in the enclosed space.

5. The rearview mirror with display function according to claim 2, wherein an orthographic projection of the display structure layer on the rearview mirror structure layer partially overlaps the rearview mirror structure layer.

6. The rearview mirror with display function according to claim 5, further comprising:
   a cover plate, defining an enclosed space with the second transparent substrate of the rearview mirror structure layer, wherein the display structure layer, the rearview mirror structure layer, and the plastic frame are located in the enclosed space, and one side of the cover plate is flush with a fourth surface of the second transparent substrate opposite to the third surface.

7. The rearview mirror with display function according to claim 2, wherein a peripheral edge of the display structure layer protrudes from a peripheral edge of the rearview mirror structure layer by a spacing.

8. The rearview mirror with display function according to claim 1, wherein the insulating substrate is a glass substrate.

9. The rearview mirror with display function according to claim 8, wherein a peripheral edge of the second transparent substrate protrudes from a peripheral edge of the glass substrate by a spacing, and the peripheral edge of the glass substrate is flush with a peripheral edge of the display structure layer.

10. The rearview mirror with display function according to claim 8, wherein an orthographic projection of the display structure layer on the second transparent substrate partially overlaps an orthographic projection of the glass substrate on the second transparent substrate.

11. The rearview mirror with display function according to claim 8, wherein a peripheral edge of the glass substrate protrudes from a peripheral edge of the second transparent substrate by a spacing, and the peripheral edge of the glass substrate is flush with a peripheral edge of the display structure layer.

12. The rearview mirror with display function according to claim 8, wherein the rearview mirror structure layer further includes an optical adhesive layer disposed between the glass substrate and the touch sensing layer.

13. The rearview mirror with display function according to claim 12, wherein a peripheral edge of the second transparent substrate protrudes from a peripheral edge of the glass substrate by a spacing, and the peripheral edge of the glass substrate is flush with a peripheral edge of the display structure layer.

14. The rearview mirror with display function according to claim 13, further comprising:
a cover plate, disposed on the second transparent substrate of the rearview mirror structure layer, and defining an enclosed space with the second transparent substrate, wherein the display structure layer, the plastic frame, the transparent electrode layer, the glass substrate, the optical adhesive layer, the touch sensing layer, and the ring-shaped shielding layer are located in the enclosed space.

15. The rearview mirror with display function according to claim 12, wherein a peripheral edge of the second transparent substrate is flush with a peripheral edge of the glass substrate, and an orthographic projection of the display structure layer on the rearview mirror structure layer partially overlaps the rearview mirror structure layer.

16. The rearview mirror with display function according to claim 15, further comprising:
a cover plate, defining an enclosed space with the second transparent substrate of the rearview mirror structure layer, wherein the display structure layer, the plastic frame, and the rearview mirror structure layer are located in the enclosed space, and one side of the cover plate is flush with a fourth surface of the second transparent substrate opposite to the third surface.

17. The rearview mirror with display function according to claim 8, wherein a peripheral edge of the display structure layer protrudes from a peripheral edge of the rearview mirror structure layer by a spacing, and a peripheral edge of the glass substrate is flush with a peripheral edge of the second transparent substrate.

18. The rearview mirror with display function according to claim 17, further comprising:
a cover plate, defining an enclosed space with the second transparent substrate of the rearview mirror structure layer, wherein the display structure layer, the plastic frame, and the rearview mirror structure layer are located in the enclosed space, and one side of the cover plate is flush with a fourth surface of the second transparent substrate opposite to the third surface; and
at least one auxiliary apparatus, disposed around the rearview mirror structure layer, and located in the enclosed space.

19. The rearview mirror with display function according to claim 18, wherein the at least one auxiliary apparatus comprises at least one ambient light source detection sensor, at least one blind spot auxiliary device, at least one Bluetooth antenna, or a combination of the above components.

20. The rearview mirror with display function according to claim 1, wherein the display body layer of the display structure layer comprises a plurality of light-emitting diodes, an insulating layer, a conductive circuit structure, and a protective layer, the light-emitting diodes are dispersedly disposed on the first transparent substrate, the insulating layer covers the light-emitting diodes, the conductive circuit structure passes through the insulating layer to be electrically connected to the light-emitting diodes, and the protective layer covers the conductive circuit structure.

21. The rearview mirror with display function according to claim 20, wherein the light-emitting diodes include a plurality of micro light-emitting diodes.

22. The rearview mirror with display function according to claim 1, wherein a surface shape of the rearview mirror comprises a circle, an ellipse, or a polygon.

23. The rearview mirror with display function according to claim 1, wherein a visible surface shape of the second transparent substrate comprises a plane or a curved surface.

24. The rearview mirror with display function according to claim 1, wherein a visible surface area of the second transparent substrate is a full mirror surface.

25. A manufacturing method of a rearview mirror with display function, comprising:
providing a display structure layer, wherein the display structure layer comprises a first transparent substrate, a display body layer, and a transflective layer, the first transparent substrate has a first surface and a second surface opposite to each other, the display body layer is disposed on the first surface, and the transflective layer is disposed on the second surface;
providing a rearview mirror structure layer, wherein the rearview mirror structure layer comprises a second transparent substrate, a ring-shaped shielding layer, a touch sensing layer, an insulating substrate, and a transparent electrode layer, the second transparent substrate has a third surface, the ring-shaped shielding layer is disposed around the third surface, the touch sensing layer covers the third surface and the ring-shaped shielding layer, the ring-shaped shielding layer is electrically insulated from the touch sensing layer, the insulating substrate is disposed on the touch sensing layer, and the transparent electrode layer is disposed on the insulating substrate;
fixing the display structure layer and the rearview mirror structure layer with a plastic frame, wherein the plastic frame is located between the transflective layer of the display structure layer and the transparent electrode layer of the rearview mirror structure layer, and the plastic frame, the transflective layer, and the transparent electrode layer define an accommodating space; and
infusing an electrochromic material into the accommodating space.

26. The manufacturing method of the rearview mirror with display function according to claim 25, wherein a step of providing the display structure layer comprises:
dispersedly disposing a plurality of light-emitting diodes on the first surface of the first transparent substrate;
forming an insulating layer to cover the light-emitting diodes;
forming a conductive circuit structure on the insulating layer, wherein the conductive circuit structure passes through the insulating layer and is electrically connected to the light-emitting diodes;
forming a protective layer to cover the conductive circuit structure, wherein the light-emitting diodes, the insulating layer, the conductive circuit structure, and the protective layer define the display body layer; and flipping over the first transparent substrate and the display body layer thereon to form the transflective layer on the second surface of the first transparent substrate.

27. The manufacturing method of the rearview mirror with display function according to claim 25, wherein a step of providing the rearview mirror structure layer comprises:

forming the ring-shaped shielding layer on the second transparent substrate;

forming the touch sensing layer on the second transparent substrate, wherein the touch sensing layer covers the third surface and the ring-shaped shielding layer;

forming the insulating substrate on the touch sensing layer; and forming the transparent electrode layer on the insulating substrate.

\* \* \* \* \*